No. 844,236. PATENTED FEB. 12, 1907.
H. BESSER.
MOLD.
APPLICATION FILED JUNE 29, 1906.
2 SHEETS—SHEET 1.
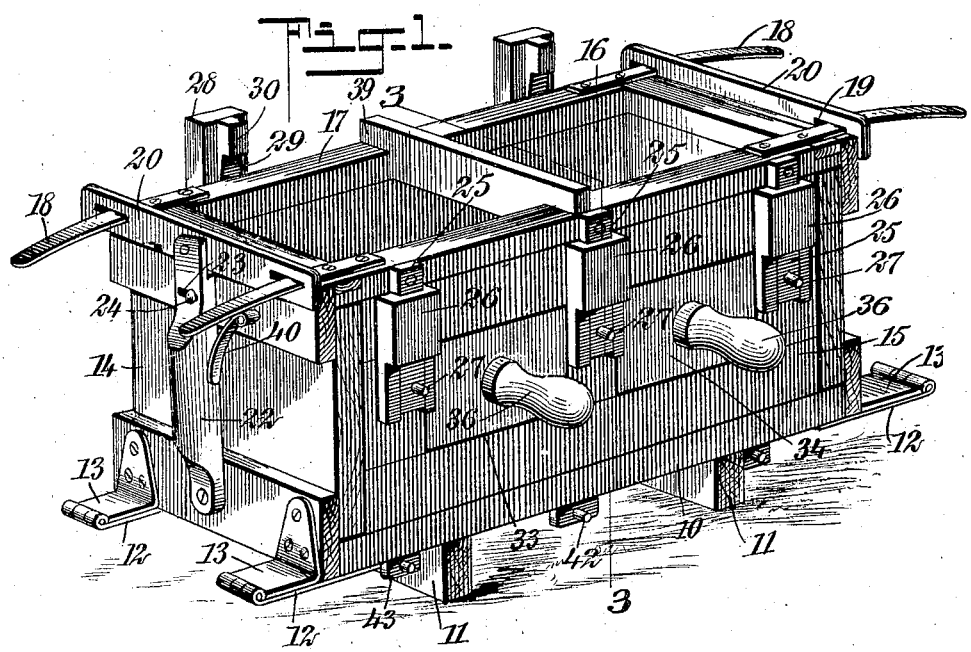
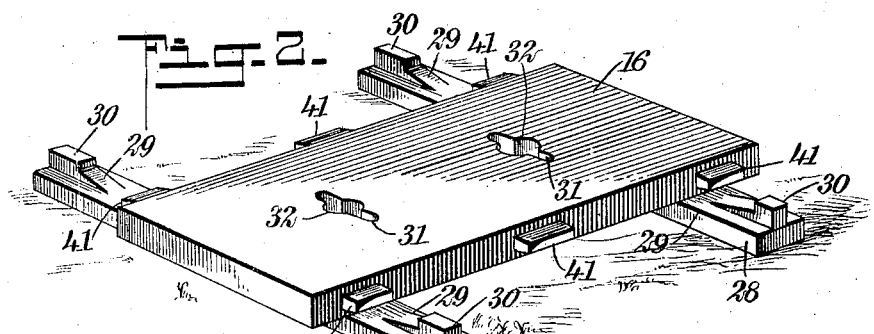
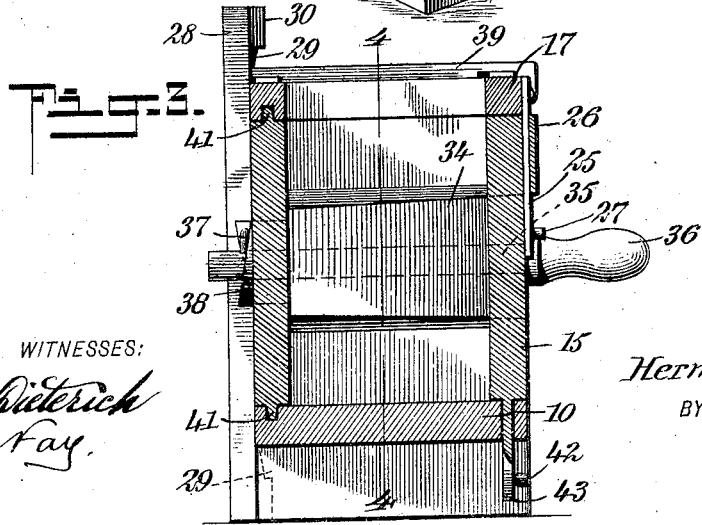
WITNESSES:
H. S. Diederich
O. E. Fay.
INVENTOR
Herman Besser
BY Munn & Co
ATTORNEYS No. 844,236. PATENTED FEB. 12, 1907.
H. BESSER.
MOLD.
APPLICATION FILED JUNE 29, 1906.
2 SHEETS—SHEET 2.
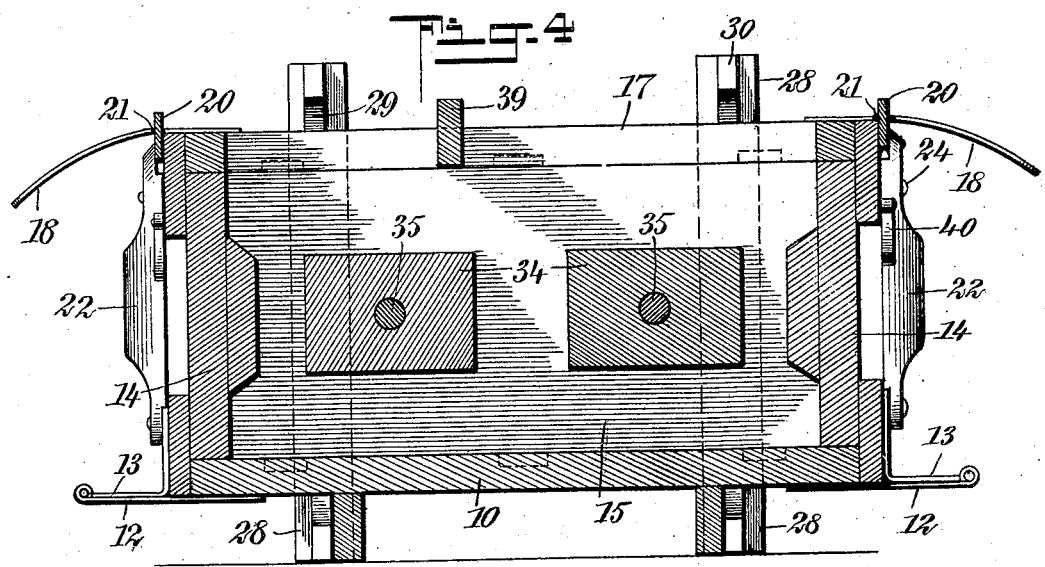
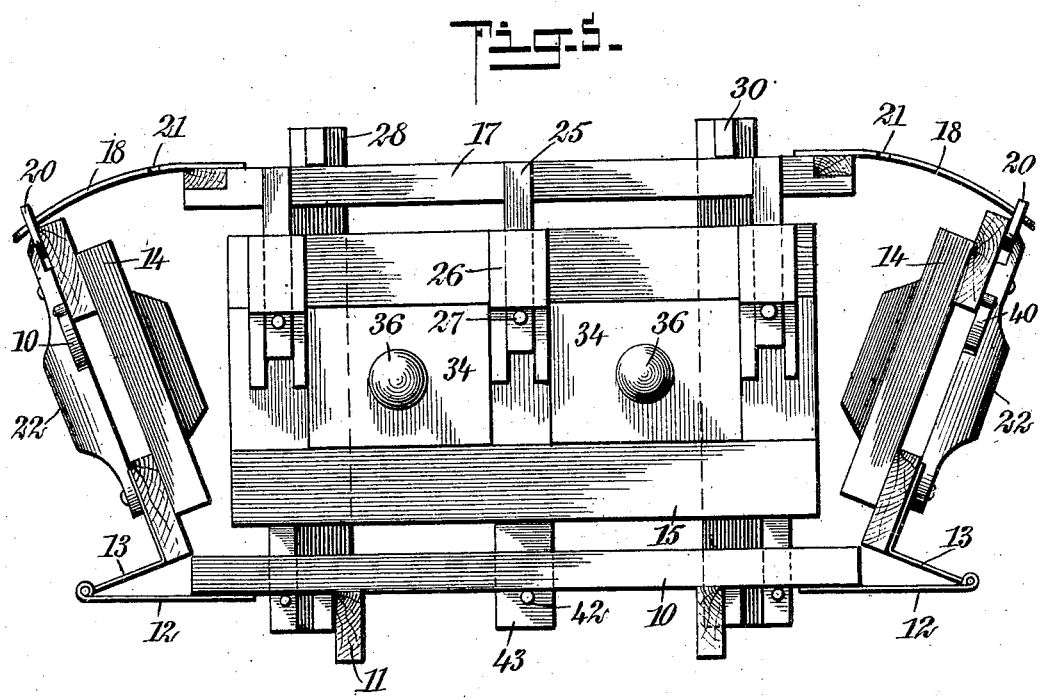
WITNESSES:
INVENTOR
*Herman Besser*
BY
ATTORNEYS

UNITED STATES PATENT OFFICE.

HERMAN BESSER, OF ALPENA, MICHIGAN.

MOLD.

No. 844,236.    Specification of Letters Patent.    Patented Feb. 12, 1907.

Application filed June 29, 1906. Serial No. 324,012.

*To all whom it may concern:*

Be it known that I, HERMAN BESSER, a citizen of the United States, and a resident of Alpena, in the county of Alpena and State of Michigan, have invented a new and Improved Mold, of which the following is a full clear, and exact description.

My invention relates to a mold for molding plastic materials, and applicable especially to the molding of building-blocks and articles of that character.

The principal objects of the invention are to provide means whereby the blocks can be molded face down, the cores withdrawn vertically after the mold has been filled and turned over on the pallet; to provide means for automatically taking up the pallets and locking them to the mold, and depositing the molded article on the pallets, and especially to provide means whereby the various parts of the mold can be readily separated from the molded article without injuring the surfaces thereof.

Reference is to be had to the accompanying drawings, forming a part of this specification, in which similar characters of reference indicate corresponding parts in all the figures.

Figure 1 is a perspective view of the mold in the position which it assumes when the material is introduced into it. Fig. 2 is a perspective view of the pallet which I prefer to employ, this pallet constituting the rear side of the mold in Fig. 1. Fig. 3 is a sectional view on the line 3 3 of Fig. 1. Fig. 4 is a sectional view on the line 4 4 of Fig. 3, and Fig. 5 is a plan of the mold turned over on the pallet with the parts separated.

I will first describe the mold as it appears in Fig. 1, in position for the molding material to be introduced. In this form a plate 10 constitutes the bottom of the mold, this plate being mounted on legs 11 or the like. From the bottom of the plate 10 extend hinge-sections 12. These sections project quite a distance beyond the ends of the plate in order to provide a pivot for the hinge-sections 13 at such a point that end walls 14, which are connected with the sections 13, will readily spring away from the molded article, and is such that all parts of the end sections will draw away from the article from the beginning of the swinging motion. Supported on the plate 10 are a pair of plates 15 and 16. The plate 16, which when the mold is being filled constitutes the rear of the mold, is designed to operate as a pallet, as will be explained below. These two walls are surmounted by a frame 17. This in the present form is rectangular or so made as to conform with the general shape of the article to be molded and rests upon the tops of all the side and end walls. It is provided with one or more guides 18 on each end, which pass through slots 19 in bars 20, which are mounted on the end walls. On account of the particular curve of the guides 18, which is obtained by drawing them from a point inside the pivots of the hinges 12 and 13 as a center, the swinging of the end sections outwardly from the molded article causes the frame 17 to be slightly raised. The guides 18 are provided with notches 21, adapted to receive the end of the slots 19 to lock the walls and frame in closed position. The plates 20 are not mounted rigidly upon the end walls but are mounted to slide laterally thereon, being mounted on handles 22. These handles are provided with slots 23, in which are located pins 24, mounted in stationary position on the end walls. It will be obvious that this handle may be used to lock and unlock the end walls and frame and thereafter to withdraw the end walls and lift the frame.

When the frame is lifted, the wall or plate 15 is also moved, and I will now describe the means which I have employed for accomplishing this result. Extending downwardly from this frame are a series of slides 25, working in ways 26 on the plate 15. Each slide is provided with a pin 27, adapted to engage the bottom edge of the exposed portion of the ways. It will be seen that the frame can be lifted a certain distance without affecting the plate 15, but that when it is lifted far enough to cause the pins 27 to engage the bottom of the ways 26 the plate 15 will be slightly lifted. The plate 16 is not operated upon in this way for the reason that when these motions are given to the parts of the mold the mold is turned over on the plate 16, which then acts as a pallet. This plate is provided with a pair of cleats 28, on which are located wedges 29, having abutments 30 at their ends. The two edges and opposite ends of each cleat extend in opposite directions, and the purpose of them is to cause the plate 10 and the frame 17 to move upwardly a slight distance, when the mold is turned over on the pallet and the end walls swing outwardly, as has been described.

When hollow articles are to be molded, the plate or pallet 16 is provided with slots 31, each having a central circular portion 32, and the plate 15 is provided with openings 33 for receiving cores 34. Each core is provided with a rod 35, having a handle 36, and with a pin 37, located beyond the plate or pallet 16 and adapted to coöperate with cam-surfaces 38 on the rear side thereof.

In operation the mold is set up as shown in Fig. 1 and the molding material introduced. A sweep or strickle 39 may then be moved across the top of the frame 17, which serves as a guide to smooth off the top of the molding material in a desired manner. The mold is then lifted by the handles 22 and turned over on the pallet 16. These handles are then slightly lifted in opposition to the spring 40, so as to unlock the plates 20 from the guides 18. Then these handles are swung outwardly on the hinges. The first effect of this operation is to move the frame 17 outwardly, as has been indicated above, the second effect being to move the plate 15 both upwardly and outwardly. An additional effect is to move the frame 17 up along the wedges 29, against the abutments 30, and as the further opening of the end walls forces the plate 10 and the frame 17 farther apart the plate 10 will be forced up the opposite inclines 29 until it reaches the other abutments 30. Therefore both the frame and plate will be slightly lifted. The pallet is provided with tenons 41, which fit in openings in the frame 17 and the plate 10; but, as will be obvious, the two last-mentioned elements will be withdrawn from these tenons before they are lifted. The motion of the plate 15 is also limited by pins 42 on slides 43, which extend through the plate 10. If a hollow article is being molded, the handles 36 are now turned, so as to release the pins 37 from the cam-surfaces 38 and allow them to be withdrawn through the slots 31, which permits the cores to be withdrawn vertically in an obvious manner, leaving the finished block on the pallet 16. The machine is then moved along to another pallet placed upon it and the end walls closed, which automatically connects the pallet with the remainder of the mold and allows it to be turned up in the position shown in Fig. 1.

It will be seen that by this construction every part of the mold is forced to move away from the molded article either simultaneously with the other parts, or nearly so, and it is efficiently separated from the product of the machine.

Having thus described my invention, I claim—

1. In a mold, the combination of a side wall adapted to serve as a pallet and having wedges connected therewith, and a plurality of movable walls, certain of said movable walls being adapted to coact with said wedges.

2. In a mold, the combination of a pallet, movable end walls, a plurality of movable walls connected with the end walls, and means connected with the pallet for moving the last-named walls when the end walls are moved.

3. In a mold, the combination of a pallet, a bottom or side wall adapted to be mounted on the pallet, a pair of end walls connected with said bottom or side wall, and means connected with the pallet for lifting the mold when the end walls are swung outwardly therefrom.

4. In a mold, the combination of a pallet, a bottom or side wall adapted to be mounted on the pallet, a pair of end walls connected with said bottom or side wall, means connected with the pallet for lifting the mold when the end walls are swung outwardly therefrom, said means comprising a plurality of wedges, and a guide connected with each end wall.

5. In a mold, the combination of a plate, a pair of end walls pivotally connected therewith at points beyond the end of said plate, and means for locking each end wall in closed position, the said means including a bar mounted to slide on the end wall, and a handle for moving said bar.

6. In a mold, the combination of a plate constituting one wall of the mold, a wall constituting another wall of the mold, a hinge having two sections, one section connected with the plate and the other with the wall, said hinge-section extending longitudinally from the plate, whereby the wall is adapted to swing outwardly from the plate on a center beyond the edge thereof, guides, means on the wall for engaging said guides, and means for locking the wall in closed position.

7. In a mold, the combination of a plate, a wall pivoted to the plate at a point beyond the edge thereof, a frame having guides, and means connected with said wall for moving said frame away from the plate when the wall is swung on its pivot.

8. In a mold, the combination of a plate, a wall pivoted to the plate at a point beyond the edge thereof, a frame having guides, means connected with said wall for moving said frame away from the plate when the wall is swung on its pivot, and means for moving both the plate and the frame in a direction transverse to the direction of said movement.

9. In a mold, the combination of a plate, a wall pivotally connected therewith, a movable frame having guides extending outwardly therefrom and drawn on the arcs of circles whose centers are nearer the center of the plate than the pivots on which the wall is mounted, and means connected with said wall for engaging the guides and controlling the motion of the frame.

10. In a mold, the combination of a plate, a wall pivotally connected therewith, a movable frame having guides extending outwardly therefrom and drawn on the arcs of circles whose centers are nearer the center of the plate than the pivots on which the wall is mounted, means connected with said wall for engaging the guides and controlling the motion of the frame, and means on said wall for moving it and for locking the wall with respect to the frame.

11. In a mold, the combination of a movable wall, a handle pivotally mounted thereon, a bar mounted on said handle and having a slot, a frame provided with a guide having a notch and passing through said slot, whereby the motion of the wall will cause said frame to move.

12. In a mold, the combination of a movable side wall a movable end wall, a frame, means connected with the end wall for automatically moving the frame when the end wall moves, and means connected with the frame for moving the side wall.

13. In a mold, the combination of a movable side wall, a movable end wall, a frame, means connected with the end wall for automatically moving the frame when the end wall moves, and means connected with the frame for moving the side wall, said last-named means comprising a slide mounted on the frame and having a projection and a pair of ways on the side wall having a slotted portion adapted to be engaged by said pin.

14. In a mold, the combination of a movable side wall, a movable end wall, a frame, means connected with the end wall for automatically moving the frame when the end wall moves, means connected with the frame for moving the side wall, a pallet located opposite said side wall, said pallet being provided with a slot, said side wall being provided with a perforation, and a core adapted to rest in said perforation and extend across the mold, said core having a locking device adapted to pass through the slot in the pallet.

15. In a mold, the combination of a perforated movable side wall, movable end walls, a frame, means connected with the end walls for automatically moving the frame when the end walls move, means connected with the frame for moving the said side wall, a pallet located opposite said side wall and adapted to support the mold and provided with a slot, a core adapted to rest in said perforation and extend across the mold, a locking device for said core comprising a rod passing through it, a pin on the end of the rod, and a cam-surface on the rear of the pallet for engaging said pin.

16. In a mold, the combination of a plate, constituting one wall of the mold, movable end walls pivotally connected with said plate, a pallet adapted to serve as one of the other mold-walls, and means for automatically connecting the pallet with the remainder of the mold when the end walls are closed.

17. In a mold, the combination of a plate forming the bottom wall of the mold, end walls having a hinged connection with the plate and adapted to swing outwardly therefrom, a movable side wall, a pallet adapted to serve as the other side wall, and means for automatically locking the pallet in position when the end walls are moved to closed position.

In testimony whereof I have signed my name to this specification in the presence of two subscribing witnesses.

HERMAN BESSER.

Witnesses:
JOHN R. McHARG,
VERNON C. RUTLEDGE.